United States Patent
Chuter et al.

(10) Patent No.: US 9,912,920 B2
(45) Date of Patent: Mar. 6, 2018

(54) WIRELESS PEEPHOLE CAMERA AND DOOR STATUS INDICATOR

(71) Applicant: Building 10 Technology Inc., Austin, TX (US)

(72) Inventors: Christopher John Chuter, Austin, TX (US); John David Genet, Austin, TX (US); Craig Carroll Sullender, Austin, TX (US)

(73) Assignee: Building 10 Technology Inc., Austin, TX (US)

( * ) Notice: Subject to any disclaimer, the term of this patent is extended or adjusted under 35 U.S.C. 154(b) by 222 days.

(21) Appl. No.: 14/826,843

(22) Filed: Aug. 14, 2015

(65) Prior Publication Data

US 2016/0050399 A1    Feb. 18, 2016

Related U.S. Application Data

(60) Provisional application No. 62/037,991, filed on Aug. 15, 2014.

(51) Int. Cl.
| | |
|---|---|
| *H04N 7/18* | (2006.01) |
| *G08B 13/22* | (2006.01) |
| *H04N 7/14* | (2006.01) |
| *G08B 13/08* | (2006.01) |
| *G08B 13/196* | (2006.01) |

(52) U.S. Cl.
CPC ............ *H04N 7/186* (2013.01); *G08B 13/08* (2013.01); *G08B 13/19695* (2013.01)

(58) Field of Classification Search
CPC ... G08B 13/08; G08B 13/19695; H04N 7/186
See application file for complete search history.

(56) References Cited

U.S. PATENT DOCUMENTS

| | | | |
|---|---|---|---|
| 5,974,643 A | 11/1999 | Hays et al. | |
| 7,217,045 B2 | 5/2007 | Jones | |
| 2004/0085450 A1* | 5/2004 | Stuart | H04N 7/186 348/156 |
| 2004/0113778 A1 | 6/2004 | Script et al. | |
| 2006/0221183 A1* | 10/2006 | Sham | H04N 7/186 348/155 |
| 2009/0091618 A1* | 4/2009 | Anderson | B60R 1/00 348/143 |
| 2010/0303296 A1 | 12/2010 | Hattori | |
| 2012/0113253 A1 | 5/2012 | Slater | |
| 2012/0288267 A1 | 11/2012 | Cuddeback | |
| 2013/0045763 A1* | 2/2013 | Ruiz | H04M 1/0291 455/466 |

(Continued)

FOREIGN PATENT DOCUMENTS

WO    WO2016025864 A1    2/2016

OTHER PUBLICATIONS

International Search Report and Written Opinion dated Jan. 4, 2016 in Patent Cooperation Treaty Application PCT/US2015/045329, filed Aug. 15, 2015.

*Primary Examiner* — Francis G Geroleo
(74) *Attorney, Agent, or Firm* — Carr & Ferrell LLP

(57) ABSTRACT

The present application is directed to methods and devices for detection and notification of door status events. A camera may be coupled to a peephole in a door and one or more images may be captured when a door status event occurs. The images may be uploaded to a computer network.

13 Claims, 8 Drawing Sheets

(56) References Cited

U.S. PATENT DOCUMENTS

2013/0113928 A1 5/2013 Feldman
2013/0300866 A1 11/2013 Kildevaeld
2014/0139666 A1* 5/2014 Wei .................... H04N 5/23245
                                              348/143
2015/0365570 A1* 12/2015 Kim .................... G08B 13/1445
                                              348/374

* cited by examiner

WIRELESS PEEPHOLE CAMERA AND DOOR STATUS INDICATOR

CROSS-REFERENCE TO RELATED APPLICATIONS

The present application claims the benefit of U.S. Provisional Application No. 62/037,991, filed on Aug. 15, 2014, the entire disclosure of which is hereby incorporated by reference for all purposes.

FIELD OF THE INVENTION

The present invention relates generally to the field of home security, and more specifically to methods and devices to detect and record door status events.

BACKGROUND

Every home, office, apartment, and hotel room has at least one door that separates the interior from the outside world. Many of these doors provide a peephole in the door to allow a person on the inside to securely see through the door without being seen by anyone on the other side.

Conventional peepholes are impossible to use unless a person is actually standing at the door to look through the peephole. Enhancement devices have been created to record images through the peephole, but the user must still interact with the device in order to access the images.

With the worldwide explosion of cell phone ownership, people are much more connected and are used to being instantly informed of events that occur that affect their lives. If a cell phone owner misses a call, the expectation is that the caller will leave a message. Even if that does not happen, the missed call is recorded in a log and can be reviewed by the phone owner at a later time.

Wireless networking technology is also relatively ubiquitous in modern life and allows devices to transmit and receive data without physical connections.

SUMMARY

The present application is directed to methods and devices for detection and notification of door status events. An exemplary device may comprise a mounting bracket coupled to a peephole in a door, and a camera apparatus coupled to the mounting bracket. The camera apparatus may comprise a camera positioned such that the camera is capable of capturing images through the peephole, a sensor capable of sensing a door status event at the door or in proximity to the door, and a wireless transmitter/receiver capable of communicating with a wireless network and transmitting digital information via the wireless network. The camera apparatus may further comprise a central processing unit capable of storing and executing computer code to initiate operation of the camera to capture one or more images visible through the peephole when the door status event sensed by the sensor exceeds a predetermined level. The processing unit may also initiate operation of the wireless transmitter/receiver to transmit the one or more images to a predetermined destination on the wireless network.

According to additional exemplary embodiments, the present application may be directed to devices for detection and notification of door status events. An exemplary device may comprise a mounting bracket that has a hole adapted to receive an interior portion of a peephole device therein. The interior portion of the peephole device may couple the mounting bracket to a door when the interior portion of the peephole device is coupled to an exterior portion of the peephole device in the door. A camera apparatus may be coupled to the mounting bracket, the camera apparatus comprising a camera positioned such that the camera is capable of capturing images through the peephole device, a sensor capable of sensing vibration or spatial movement of the door, and a wireless transmitter/receiver capable of communicating with a wireless network and transmitting digital information via the wireless network. The camera apparatus may further comprise a central processing unit capable of storing and executing computer code to initiate operation of the camera to capture one or more images visible through the peephole when the vibration or spatial movement sensed by the sensor exceeds a predetermined level. The processing unit may further initiate operation of the wireless transmitter/receiver to transmit the images to a predetermined destination on the wireless network.

According to further exemplary embodiments, the present application may be directed to methods for detection and notification of door status events. An exemplary method may comprise coupling a camera apparatus to a peephole in a door such that the camera is optically aligned with the peephole. The camera unit may comprise a sensor unit, a camera unit, a wireless transmitter/receiver unit, and a central processing unit. The sensor unit may sense a door status event at the door or in proximity to the door. An algorithm stored in memory in the processing unit may be initiated to determine whether the sensed event exceeds a predetermined threshold. When the sensed event exceeds the predetermined threshold, the camera unit may be activated and one or more images visible through the peephole may be recorded.

According to still further exemplary embodiments, the present application may be directed to methods for detection and notification of a person at a door. An exemplary method may comprise coupling a camera apparatus to a peephole in a door such that the camera unit is optically aligned with the peephole. The camera apparatus may comprise a sensor unit comprising an accelerometer, a camera unit, a wireless transmitter/receiver unit, and a central processing unit. The sensor unit may sense vibration of spatial movement of the door. An algorithm stored in memory in the processing unit may be initiated to determine whether the sensed vibration of movement exceeds a predetermined threshold. The camera unit may be activated when the sensed vibration or movement exceeds the predetermined threshold, and one or more images visible through the peephole may be recorded. A Wi-Fi connection to a computer network may be established with the wireless transmitter/receiver unit. The one or more images may be uploaded to the network. The one or more images may be delivered to an electronic device for viewing by a user.

DETAILED DESCRIPTION

Figure 1:
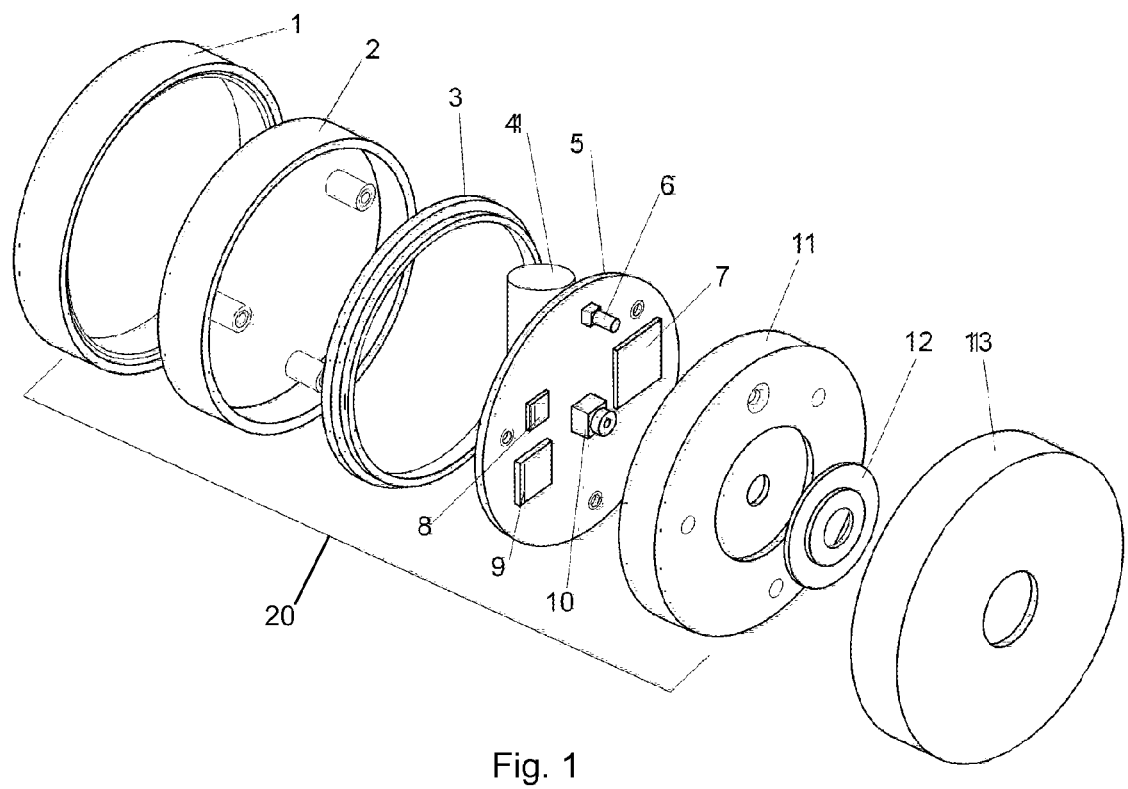
FIG. 1 is an exploded perspective view of a wireless peephole camera apparatus and mounting bracket according to various embodiments.

The present application is directed to methods and devices for detection and notification of door status events. Various embodiments bring the same level of notification and identification that users have to come to expect for missed phone calls to status events at their door. Such status events may comprise, for example, a knock on the door, opening or closing the door, inserting a key into a door lock, attempting to operate a door handle, sounds emitted in proximity to the door, heat emitted in proximity to the door, motion in proximity to the door, or any other detectable event or condition.

Various embodiments of a wireless peephole camera apparatus (hereinafter also referred to as the camera apparatus) may comprise, in part, a sensor unit and a camera unit. The camera apparatus may be coupled to the door such that the camera unit is optically aligned with a peephole in the door and any pictures taken by the camera will capture images as are visible through the peephole. Operation of the camera unit may be triggered when an event at, on, or in proximity to the door is sensed by the sensor unit. When the camera unit is operated, one or more images may be taken through a peephole in the door. The images and any ancillary data related to the event may then be transmitted via a wireless network and delivered to a configured delivery endpoint. This endpoint may be, for example, a centralized server for secure data storage, an email account, or a mobile device.

Throughout this specification and the appended claims, anywhere a reference is made to a camera taking one or more images, it is to be understood by one skilled in the art that this may refer to taking a photograph, a digital photograph, more than one photograph or digital photograph, or video of any length. No limitations are to be assumed by any use of the terms photograph, image, picture, or video.

Various embodiments may further comprise a mounting platform to couple the camera apparatus to a standard peephole. Peepholes are typically constructed to be able to be installed by screwing together an interior portion (that is, the portion of the peephole position on the interior side of the door) and an exterior portion (that is, the portion of the peephole positioned on the exterior side of the door) through a hole drilled in a door. The mounting platform may comprise a bracket adapted to receive the interior portion of the peephole as the peephole is assembled as described in more detail below, creating a solid mounting platform for the mounting of the camera apparatus.

Various embodiments of the bracket may contain magnets dispersed around the peephole that match oppositely charged magnets on the camera apparatus itself. Coupling the camera apparatus to the bracket may allow the camera to be positioned correctly over the peephole and additionally allow the camera apparatus to be conveniently and easily removed from the door without any disassembly. The magnetic coupling method provides for convenient recharging of the camera apparatus or for removing the camera apparatus to look through the peephole in the conventional fashion.

Another embodiment of the bracket, also adapted to receive the interior portion of the peephole, may use a resistance fit to couple the camera apparatus to the door. Instead of using the magnets, this bracket securely fits around the outer shell of the main device. This embodiment also provides for correctly positioning the camera over the peephole and allowing the camera apparatus to be conveniently and easily removed from the door without any disassembly.

The camera apparatus, according to various embodiments, may be capable of detecting when it is attached to or removed from the bracket, so the end user can also be notified of such an event. Additionally, the device may monitor its power level and emit notifications when power is low and recharging is necessary, or when a full recharge has been achieved.

Turning now to the drawings, FIG. 1 illustrates various components of an embodiment of the wireless peephole camera apparatus 20. The camera apparatus 20 may comprise a circuit board 5 upon which a power supply 4 (also referenced as battery 4), contact switch 6, a wireless transmitter/receiver 7, central processing unit 8, sensor 9, and camera 10 are coupled, mounted, or attached. The camera 10 may be capable of recording one or more images or video through a standard door peephole eyepiece 14 (the interior portion of the peephole, also referenced as peephole 14) and the door peephole lens 15 (the exterior portion of the peephole) installed in a hole 22 in a door 16 (see FIG. 2). The camera 10 may be in communication with and capable of being activated and controlled by the processing unit 8. The processing unit 8 may also receive the images captured by the camera 10 and may be capable of storing those images in memory (not shown) and processing those images. The contact switch 6 may determine when a connection is initiated or broken to a door mounting bracket 13 (also referenced as mounting bracket 13), and may be in communication with and capable of triggering the processing unit 8 when the camera apparatus 20 is removed from the mounting bracket 13. Similarly, the sensor 9 may be capable of detecting movement of the door 16 to which the door mounting bracket 13 and camera apparatus 20 are coupled (for example, a door 16 open/close event) as well as impacts on the door 16 (for example, a person knocking on the door 16). A door status event, if of sufficient intensity, may trigger the processing unit 8. A knock event, for example, may cause the processing unit 8 to initiate the camera 10 to capture one or more pictures through the peephole 14, 15. Any data collected from an event may be communicated to a configured endpoint through the wireless transmitter/receiver 7. The power supply 4 may be electrically coupled to the circuit board 5, which in turn may distribute power to the other components coupled to the circuit board 5.

The camera apparatus 20 may further comprise a translucent status LED ring 3. Although not shown in FIG. 1, the circuit board 5 may comprise one or more LEDs (or other light emitting devices as known in the art) to visually represent an operating status of the camera apparatus 20 to the user. For example, the LEDs may communicate a power level and wireless connection status of the camera apparatus 20 to the user. The circuit board 5 and status LED ring 3 may be contained within a housing comprised of a power supply housing 2 and a housing lid 11. The power supply housing 2 and the housing lid 11 mate with the status LED ring 3 positioned therebetween to form an enclosure for the circuit board 5. The power supply housing 2 may be further partially covered by a decorative, semi-translucent housing base 1.

In various embodiments, the processing unit 8 may comprise software or other code or firmware stored in memory (not shown). This software may control the operation of, and allow communication with, the power supply 4, contact switch 6, wireless transmitter/receiver 7, sensor 9, and camera 10. The sensor 9 may emit a signal to the processing unit 8 related to a door status event. The software may further comprise an algorithm to analyze the signal and determine whether the signal indicates a door status event of significant magnitude to trigger further operation. For example, one door status event is a knock on the door 16. The knock causes vibrations in the door 16 which may be sensed by the sensor 9. However, many events may cause some level of vibration in the door 16, but which are not knocks on the door 16. The algorithm may analyze the signal to determine whether the sensed vibrations are a knock on the door 16 which warrants further action, or merely some other event that caused vibration in the door 16 but is not a knock. Multiple algorithms may reside in memory to analyze the signal from the sensor 9 for multiple types of door status events.

Figure 2:
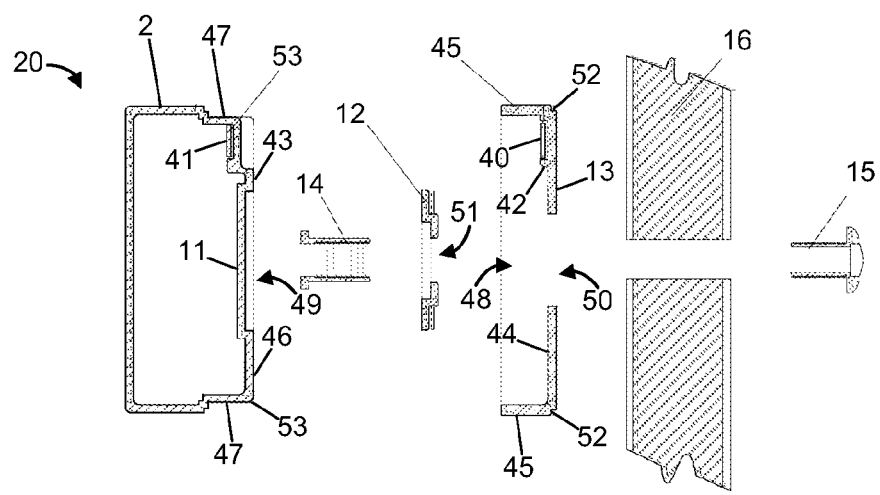
FIG. 2 is a cross-sectional exploded view of a door, peephole device, mounting bracket, and camera apparatus according to various embodiments.

FIG. 2 illustrates various embodiments of coupling the door mounting bracket 13 to the door 16. The door mounting bracket 13 may be adapted to couple securely to (and be flush against) the door 16. A hole 50 in the door mounting bracket 13 may be sized to allow a standard peephole, comprising the peephole lens 15 and the peephole eyepiece 14, to be threaded or inserted through the hole 50. Various embodiments may further comprise a peephole eyepiece adaptor 12, which may allow for peepholes of various diameters to be accommodated, and also has a hole 51 to allow the peephole eyepiece 14 to be threaded or inserted through the hole 51. Only the peephole eyepiece adaptor 12 and the door mounting bracket 13 are coupled to the door 16 such that they are not readily removable. The camera apparatus 20 may securely fit into the door mounting bracket 13, but may be removed as a single unit without having to unscrew the peephole eyepiece 14 or removing the door mounting bracket 13 from the door 16.

In various embodiments as illustrated in FIG. 2, the door mounting bracket 13 may comprise a mounting surface 44 having a peripheral edge 52. The door mounting bracket 13 may further comprise sidewalls 45 extending from the peripheral edge 52 generally perpendicular to the mounting surface 44. A receiving space 48 may be formed between the mounting surface 44 and the sidewalls 45. The mounting bracket 13 may further comprise a coupling device 40, such as a magnet, a latch, a plug or socket, or other coupling device as known in the art. In addition, the mounting bracket 13 may comprise an alignment member 42. The housing lid 11 may comprise a coupling surface 46 having a peripheral edge 53. The housing lid 11 may further comprise sidewalls 47 extending from the peripheral edge 53 generally perpendicular to the coupling surface 46. An insert 49 may be formed by the coupling surface 46 and the sidewalls 47. The insert 49 may be adapted for releasable placement in the receiving space 48. The housing lid 11 may further comprise a coupling device 41, such as a magnet, a latch, a plug or socket, or other coupling device known in the art. Coupling device 40 and coupling device 41 may be the same or may be different. For example, both coupling devices 40, 41 may be magnets. In other embodiments, one of the coupling devices 40, 41 may be a magnet and the other a metal plate. In still other embodiments, one of the coupling devices 40, 41 may be a plug and the other a socket. Any common or different devices for the coupling devices 40, 41 are within the scope of the present disclosure. Coupling device 40 and coupling device 41 may act together to couple the housing lid 11 to the mounting bracket 13 when the insert 49 is placed in the receiving space 48. In addition, the housing lid 11 may comprise a guide member 43 that engages the alignment member 42 to align the housing lid 11 relative to the mounting bracket 13 when the insert 49 is placed in the receiving space 48. When the guide member 43 engages the alignment member 42, the camera 10 within the housing lid 11 may be optically aligned with the peephole 14, 15 mounted in the hole 50 of the mounting bracket 13 and the hole 51 of the peephole eyepiece adaptor 12.

Figure 3:
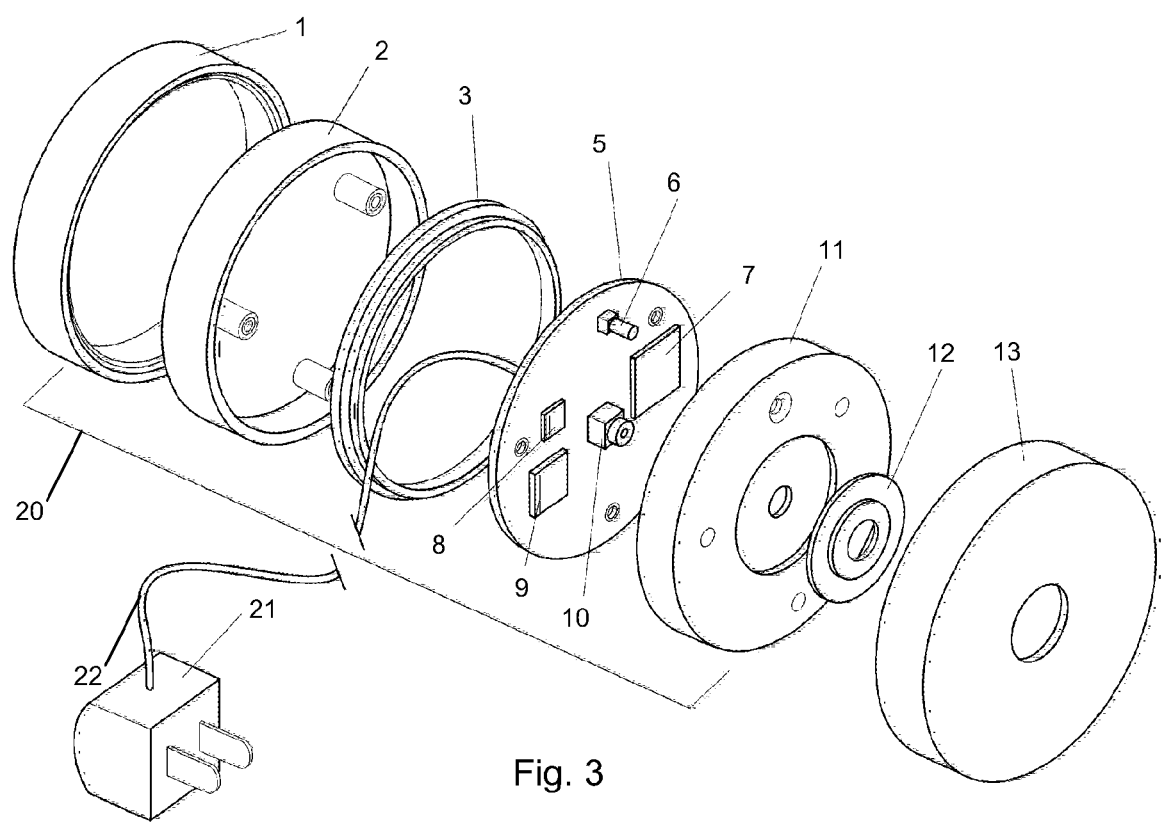
FIG. 3 is an exploded perspective view of a wireless peephole camera apparatus and mounting bracket with an AC power cord according to various embodiments.

FIG. 3 illustrates various embodiments of the camera apparatus 20 comprising a directly wired power source. In contrast to FIG. 1 in which power is supplied by a battery 4, the embodiments of FIG. 3 comprise a plug assembly 21 for connection directly to a standard AC outlet. The plug assembly 21 may further comprise an AC/DC converter, or the converter may reside on the circuit board 5. The directly wired power source may allow the camera apparatus to operate continuously without recharging the battery 4. While the status LED ring 3 may not be required to indicate battery 4 charging/recharging status, the status LED ring 3 may indicate that the camera apparatus 20 is receiving power and whether the electronic systems are function properly.

Figure 4:
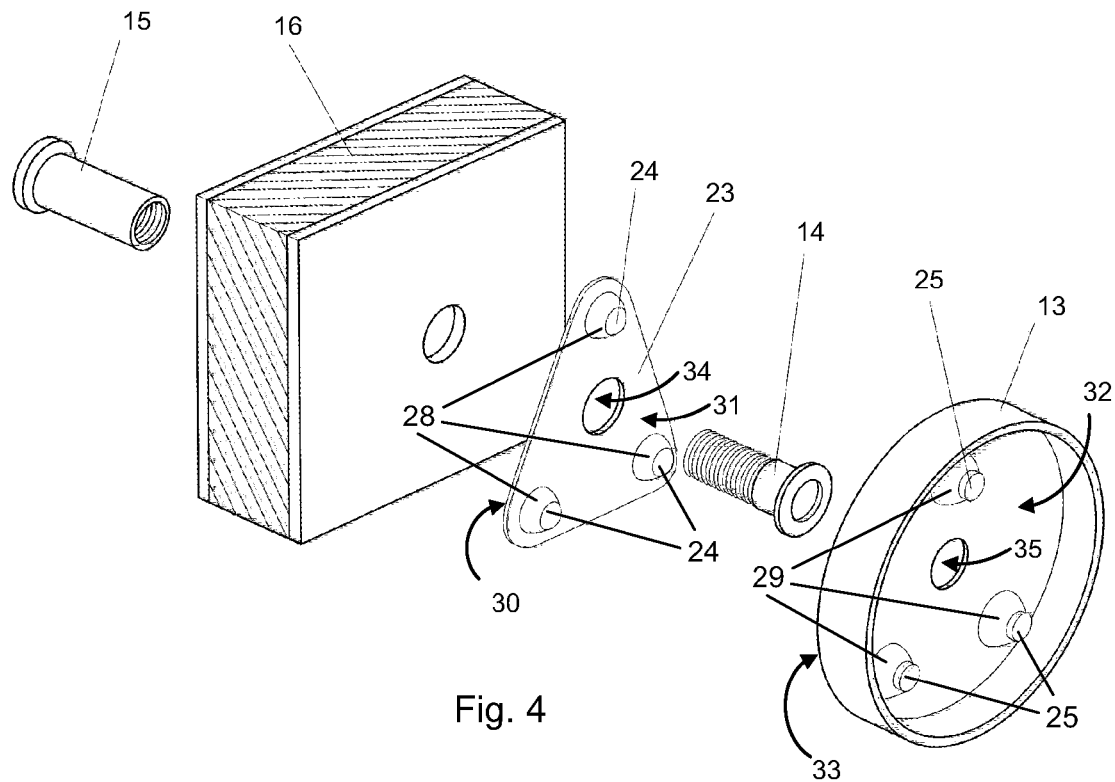
FIG. 4 is an exploded perspective view of a magnetic mounting bracket according to various embodiments.

FIG. 4 illustrates an alternate embodiment for coupling the camera apparatus 20 to the door 16. In this embodiment, a magnetic mounting plate 23 having a back surface 30 and a front surface 31 opposite the back surface 30 may be coupled to the door 16 by the peephole 14, 15 as described previously for the mounting bracket 13. When the magnetic mounting plate 23 is coupled to the door 16 (or any other surface), the back surface 30 may be in contact with the door 16, and the front side 31 may be positioned away from the door 16. The magnetic mounting plate 23 may comprise a plurality of embedded magnets 24 at intervals around the magnetic mounting plate 23. The magnets 24 may be of sufficient strength to securely hold the camera apparatus 20 in a fixed position to the door 16, so that images may be captured with the camera 10 through the peephole 14, 15. Oppositely charged magnets 25 may be embedded in the mounting bracket 13. A magnetic indicator switch (not shown) on the mounting bracket 13 may detect changes in a magnetic field between the magnets 25 on the mounting bracket 13 and the magnets 24 on the magnetic mounting plate 23, and may signal the processing unit 8, when the magnetic connection between the magnetic mounting plate 23 and magnets 25 is initiated or broken.

In various embodiments, the magnetic mounting plate 23 may further comprise raised shaped protrusions 28, upon which the magnets 24 may be mounted. Although other shapes are certainly possible, FIG. 4 illustrates conical-shaped protrusions 28. The mounting bracket 13 may comprise indentations 29, upon which magnets 25 may be mounted. The indentations 29 may be spaced to coincide with the spacing of the protrusions 28 such that each protrusion 28 engages an indentation 29 when the mounting bracket 13 is placed in proximity to the magnetic mounting plate 23. The mounting plate 23 may have a feature, such as first hole 34, and the mounting bracket may have a feature, such as second hole 35. When the protrusions 28 engage the indentations 29, the first hole 34 may be concentrically aligned. When the camera apparatus 20 is placed in the mounting bracket 13, the camera 10 may be optically aligned with the concentrically aligned first hole 34 and second hole 35, as well as the peephole 14, 15.

In various embodiments, neither the mounting plate 23 nor the mounting bracket 13 may comprise magnets. In these embodiments, the mounting plate 23 and the mounting bracket 13 may be coupled together by a resistance fit between the protrusions 28 and the indentations 29, a key and slot locking mechanism within the protrusions 28 and the indentations 29, or the like.

Figure 5:
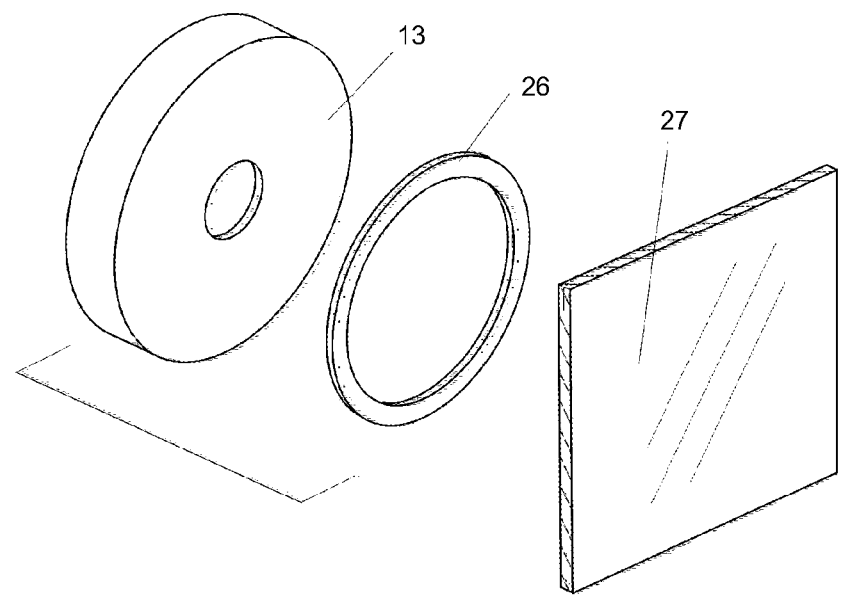
FIG. 5 is an exploded perspective view of a mounting bracket for glass according to various embodiments.

Various embodiments capable of mounting on a glass surface 27 are illustrated in FIG. 5. A double-sided adhesive 26 of any type known in the art may be coupled to the mounting bracket 13, which is then coupled to the glass surface 27. Although the adhesive 26 is illustrated as a continuous ring in FIG. 5, and appropriate shape or type of adhesive 26 as is adequate for the situation may be used. For example, the adhesive 26 may comprise multiple strips or multiple circles, squares, or other shapes. In addition, the adhesive 26 may be a liquid or semi-liquid material dispensed from a tube, bottle, or other container.

Figure 6:
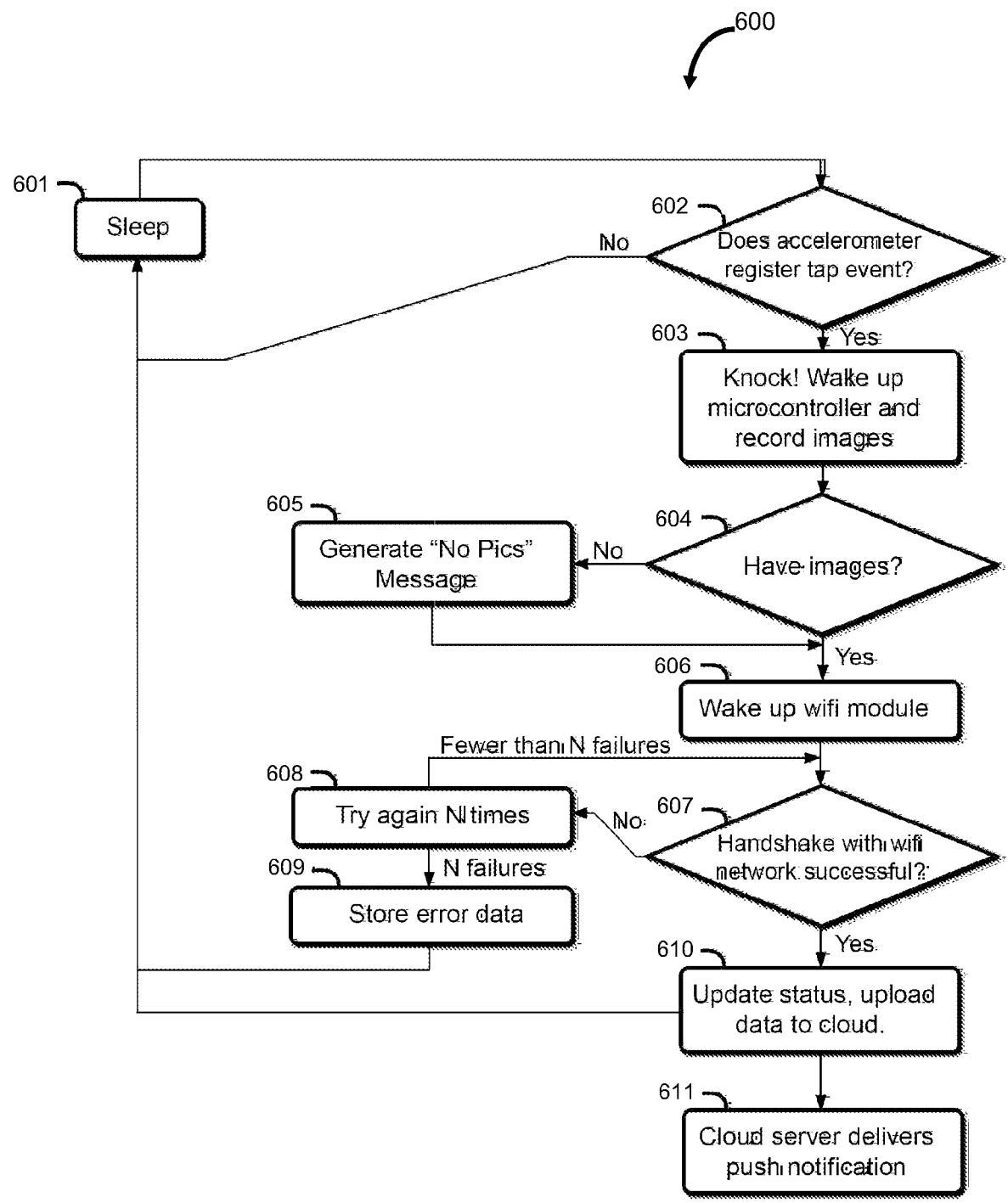
FIG. 6 is a logic flow diagram of a wireless peephole camera apparatus detecting a knock event according to various embodiments.

FIG. 6 describes a logic flow 600 of an embodiment of the wireless peephole camera apparatus 20 for detecting a door status event (specifically, a knock on the door 16) according to various embodiments. The camera apparatus 20 begins in a sleep state, Step 601. The flow 600 is initiated in Step 602 by the sensor 9, an accelerometer in this particular embodiment, registering a vibration event of sufficient strength to qualify as a "knock" (or a "tap" as specified in FIG. 6) Any detected vibration below a predetermined "knock" threshold may be ignored and the sensor 9 may return to its monitoring state, Step 601. When a valid knock is registered by the sensor 9, the sensor 9 may send a signal to the processing unit 8 to wake up and trigger the camera 10 to record one or more images (or a video stream) through the peephole 14, 15 in Step 603. If the camera 10 is able to record images, the processing unit 8 may process those images to determine if any are of sufficient quality to forward to the user and/or pick the "best" image by any available algorithm in Step 604. If no valid pictures are available, a "no picture" notification may be generated in Step 605. Regardless of whether an image is obtained, once a knock is detected, the processing unit 8 may engage the wireless transmitter/receiver 7 in Step 606 and the wireless transmitter/receiver 7 may, in turn, attempt to connect to a configured wireless network in Step 607. The connection may be re-attempted upon failure in Step 608 until either a connection is established or a configured number of retries, "N," is surpassed. If no connection can be established, an error may be recorded in Step 609, and the camera apparatus 20 may return to the sleep state, Step 601. If the connection is established, any collected data for the knock event, including one or more pictures taken by the camera 10 may be sent to the configured endpoint through the wireless network in Step 610. In this embodiment, the data may be uploaded to a centralized server, hosted in a cloud network for high availability and reliability. Alternatively, at Step 610 the image and notification may be sent directly to a computing device such as a smartphone, laptop computer, desktop computer, or the like. Upon receiving new knock data from the camera apparatus 20, the server may send a push notification to the end user's mobile device or email account in Step 611. Once the data are uploaded, the camera apparatus 20 may return to its initial, low-power sleep state, Step 601, waiting for another event.

Figure 7:
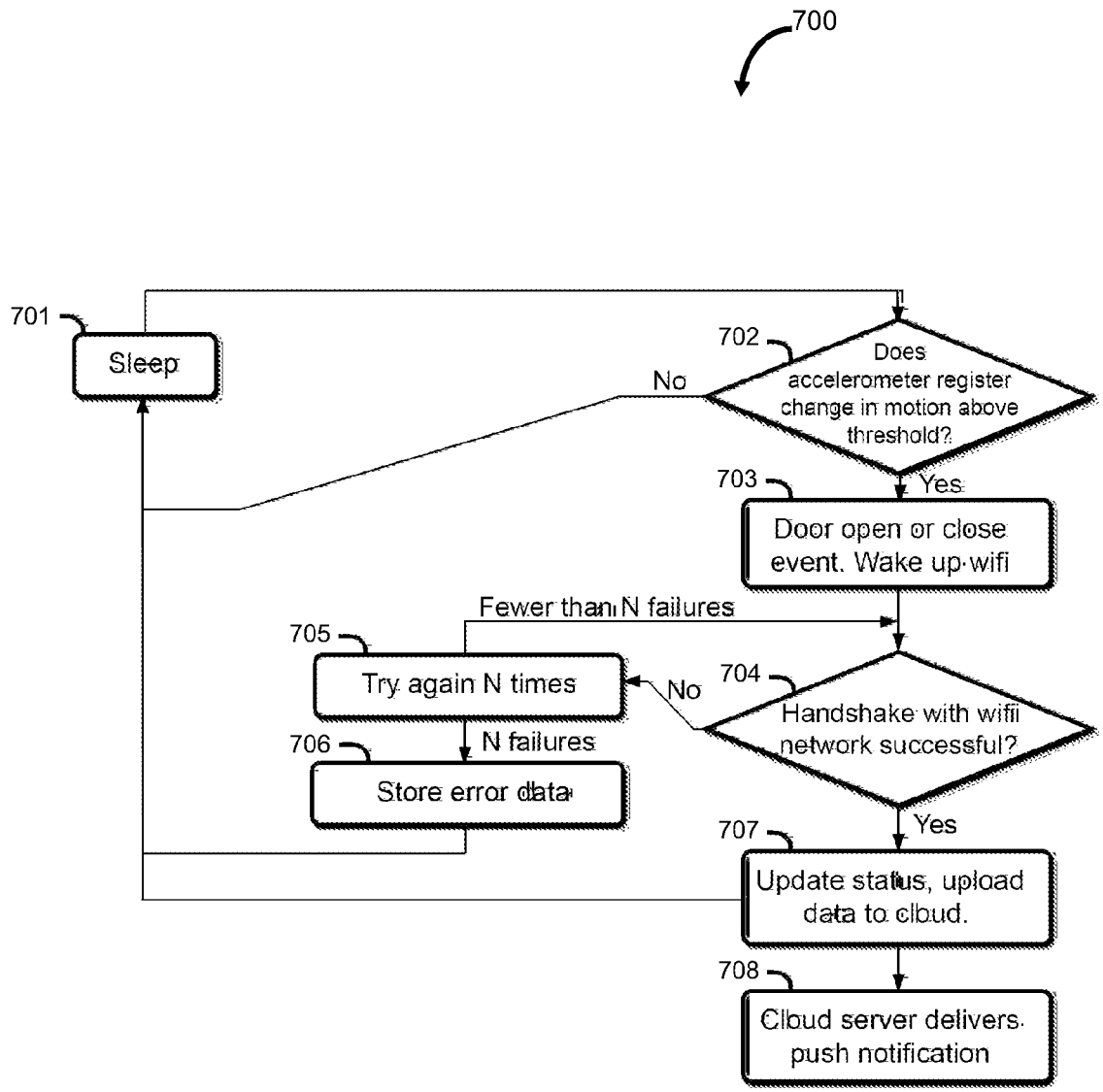
FIG. 7 is a logic flow diagram of a wireless peephole camera apparatus detecting a door opening/closing event according to various embodiments.

FIG. 7 describes the logic flow 700 of an embodiment of the wireless peephole camera apparatus 20 detecting a door status event (specifically, a door 16 open or close event). The camera apparatus 20 begins in a sleep state, Step 701. The flow 700 is initiated in Step 702 by the sensor 9, an accelerometer in this particular embodiment, registering spatial movement of the door 16 sufficient to qualify as a door 16 open or close event. Any detected movement below a predetermined movement threshold may be ignored and the sensor 9 may return to its sleep state, Step 701. When a valid movement event is registered by the sensor 9, the sensor 9 may send a signal to the processing unit 8 to wake up and engage the wireless transmitter/receiver 7 in Step 703. The wireless transmitter/receiver 7 may, in turn, attempt to connect to the configured wireless network in Step 704. The connection may be re-attempted upon failure in Step 705 until either a connection is established or a configured number of retries, "N," is surpassed. If no connection can be established, an error may be recorded in Step 706, and the camera apparatus 20 may return to the sleep state, Step 701. If the connection is established, any collected data for the motion event may be sent to the configured endpoint through the wireless network in Step 707. In this embodiment, the data may be uploaded to a centralized server, hosted in a cloud network for high availability and reliability. Alternatively, at step 707, the collected data may be sent directly to a computing device such as a smartphone, laptop computer, desktop computer, or the like. Upon receiving new movement data from the camera apparatus 20, the server may send a push notification to the end user's mobile device or email account in Step 708. Once the data are uploaded, the camera apparatus 20 may return to its initial, low-power sleep state, Step 701, waiting for another event.

Although not shown in FIG. 7, the processing unit 8 may also communicate with the camera 10 and initiate operation of the camera 10 to take one or more images once a valid movement event is detected. The captured images may be useful to identify the person opening or closing the door, particularly if the person is engaging in illegal activity.

In the embodiments described above in relation to FIGS. 6 and 7, the sensor is an accelerometer capable of detection vibration and spatial movement. While knocking and opening and closing are common door status events, one skilled in the art will readily recognize that the present disclosure is in no way limited by these examples. The accelerometer may detect vibrations caused by inserting a key into a door lock, or vibrations caused by someone attempting to operate a door handle. In either case, the camera 10 may take an image of the person attempting to open the door 16, and the image may then be sent to the user as described previously.

Further, the present embodiment is not limited in any way by the type of sensor 9. In various embodiments, the camera apparatus 20 may be configured with a sensor 9 adapted to sense any movement or condition that may occur at, on, or in proximity to the door 16. For example, the sensor 9 may sense heat. Such a sensor 9 may be useful for detecting the presence of a person in proximity to the door 16, or even a fire in proximity to the door 16. The camera 10 may then take an image of the person or condition in proximity to the door 16, and the image may then be sent to the user as described previously.

In other embodiments, the sensor 9 may sense sounds. The camera 10 may take an image when a loud sound is detected in proximity of the door 16, and the user may use the image to determine if any danger is present in proximity to the door 16.

In still other embodiments, the sensor 9 may sense motion. The camera 10 may take an image when motion sufficient to indicate a person is in proximity to the door 16. Such an image may be useful to identify a burglar or vandal that was in the area. Further, the camera 10 may be in a constant activation mode (particularly with the wired power source embodiments as depicted in FIG. 3) and the user may access a digital feed from the camera 10 (such as by accessing an application on a smartphone) to remotely look through the peephole 14, 15 when the motion sensor is activated. The smartphone application or other software may comprise facial recognition capabilities to identify any persons visible to the camera. This remote capability to look through the peephole 14, 15 may also be available even if the camera apparatus 20 lacks a sensor.

In yet other embodiments, the sensor 9 may sense the presence of metal. The camera 10 may take an image when a person comes in proximity to the door 16 and metal sufficient to be a weapon is sensed. The user may then use the image to identify whether the person is safe to allow in, or for later identification of a burglar or vandal.

Additional embodiments may comprise a sensor 9 to sense electromagnetic radiation, which may be in the form of a flashlight being shined on the door 16. Since shining a light on a door is not a typical activity, when such an event occurs, the user may view the image taken by the camera 10 to help identify the person with the flashlight and perhaps determine whether the person committed any illegal acts.

As is now obvious to one skilled in the art, the camera apparatus 20 may be equipped with one or more sensors 9 to sense any type of motion, activity, event, or condition that occurs at, on, or in proximity to the door 16. The specific embodiments presented herein are intended as being exemplary and not limiting in any way the sensory capabilities of the camera apparatus 20.

Figure 8:
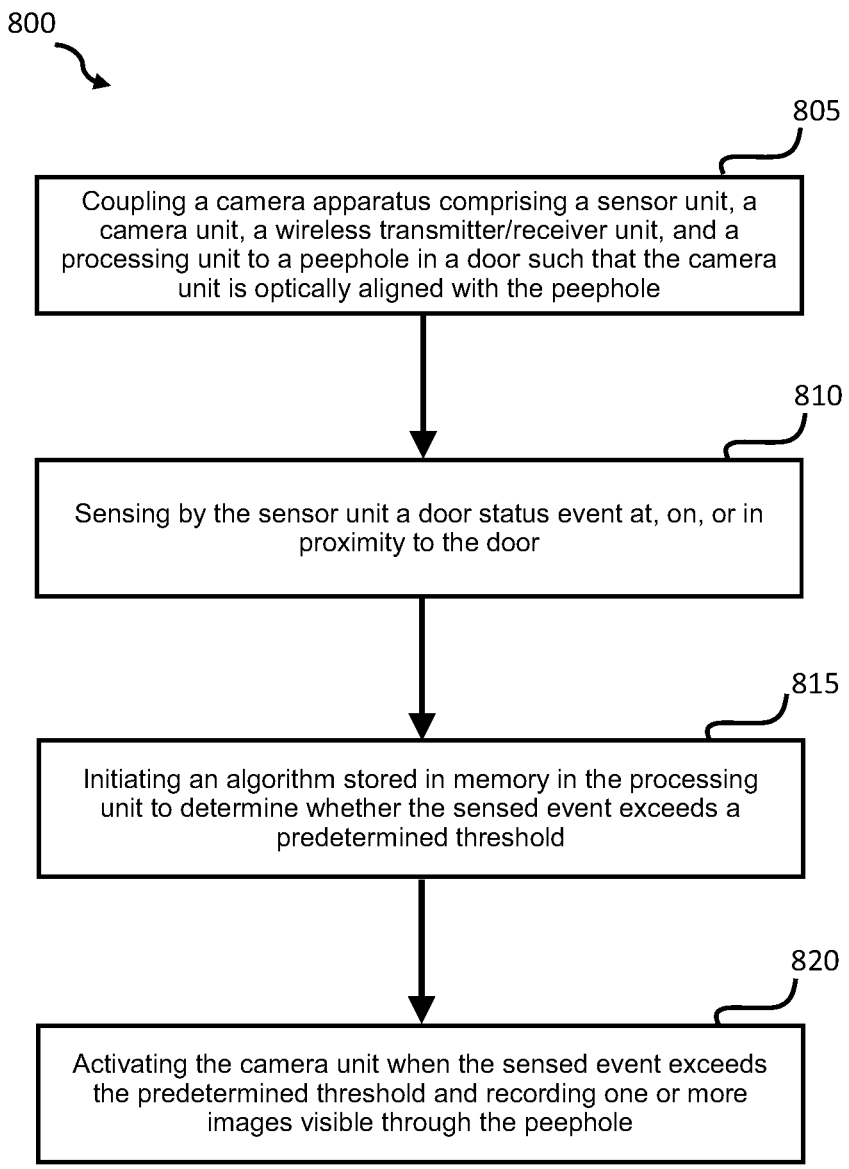
FIG. 8 is a flow diagram of an exemplary method for detection and notification of a door status event according to various embodiments.

FIG. 8 is a flowchart of an exemplary method 800 for detection and notification of a door status event. At Step 805, a camera apparatus 20 may be coupled to a peephole 14, 15 in a door 16 such that the camera unit 10 is optically aligned with the peephole 14, 15. The camera apparatus 20 may comprise a sensor unit 9, a camera unit 10, a wireless transmitter/receiver unit 7, and a processing unit 8. The sensor unit 9 may sense a door status event at, on, or in proximity to the door 16 at Step 810. At Step 815, an algorithm stored in memory in the processing unit 8 may be initiated. The algorithm may determine whether the sensed event exceeds a predetermined threshold. The camera unit 10 may be activated at Step 820 when the sensed event exceeds the predetermined threshold. The camera unit 10 may record one or more images visible through the peephole 14, 15.

Figure 9:
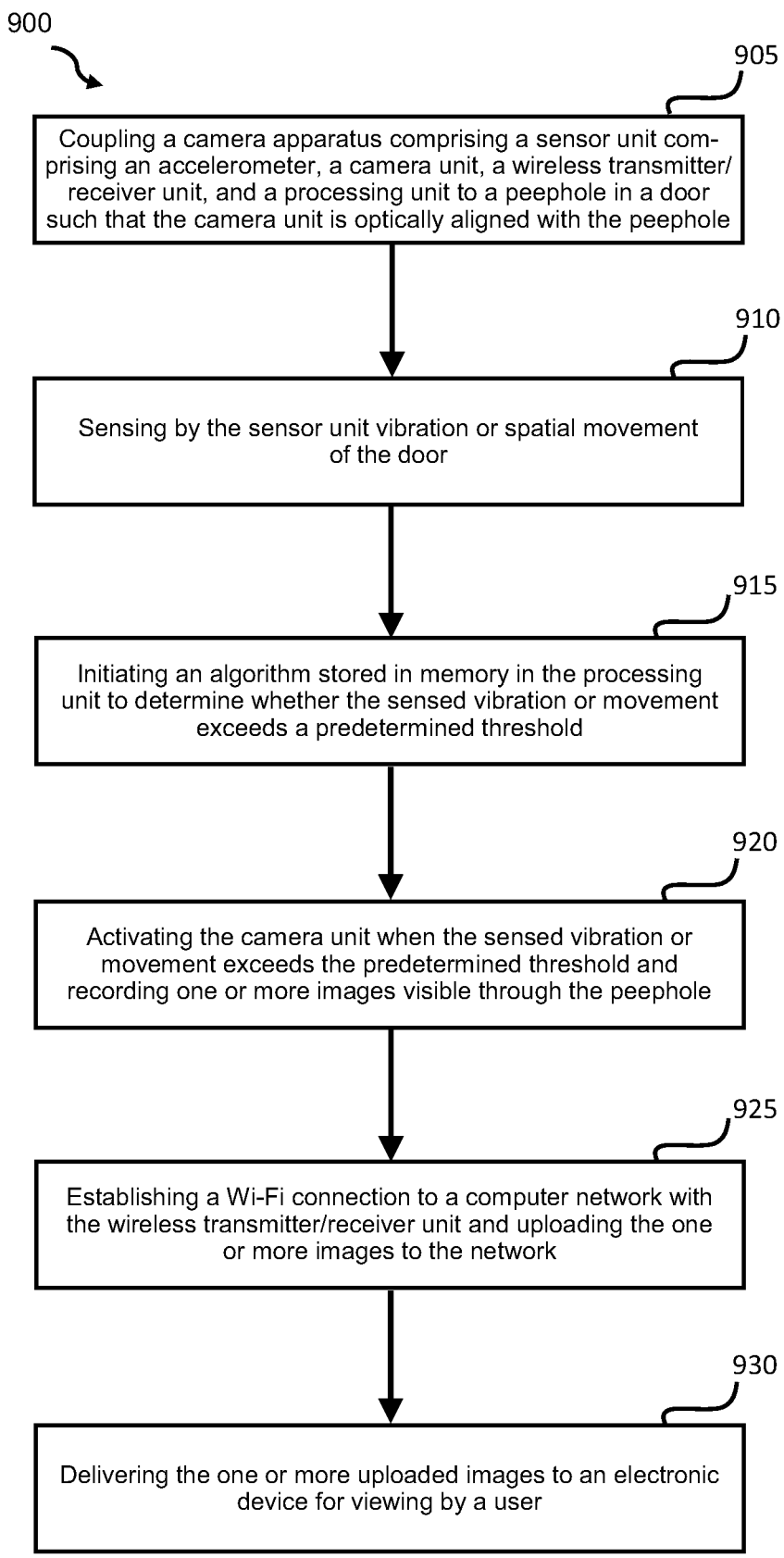
FIG. 9 is a flow diagram of an exemplary method for detection and notification of a person at a door according to various embodiments.

FIG. 9 is a flowchart of an exemplary method 900 for detection and notification of a person at a door 16. At step 905, a camera apparatus 20 comprising a sensor unit 9 comprising an accelerometer, a camera unit 10, a wireless transmitter/receiver unit 7, and a processing unit 8 may be coupled to a peephole 14, 15 in a door 16 such that the camera unit 10 is optically aligned with the peephole 14, 15. At Step 910, the sensor unit may sense vibration or movement of the door 16 caused by a knock on the door 16 or opening or closing the door 16. At Step 915, an algorithm that is stored in memory in the processing unit 8 may be initiated. The algorithm may determine whether the sensed vibration or movement exceeds a predetermined threshold. The camera unit 10 may be activated at Step 920 when the sensed vibration or movement exceeds the predetermined threshold. The camera unit 10 may record one or more images visible through the peephole 14, 15. At Step 925, a Wi-Fi connection to a computer network may be established by the wireless transmitter/receiver unit 7. The images taken by the camera 10 may be uploaded to the network. The uploaded images may be delivered to an electronic device at Step 930.

According to various embodiments, the camera apparatus 20 may communicate with a cloud-based computing environment that collects, processes, analyzes, and publishes datasets. In general, a cloud-based computing environment is a resource that typically combines the computational power of a large grouping of processors and/or that combines the storage capacity of a large group of computer memories or storage devices. For example, systems that provide a cloud resource may be utilized exclusively by their owners, such as Google™ or Yahoo!™, or such systems may be accessible to outside users who deploy applications within the computing infrastructure to obtain the benefits of large computational or storage resources.

The cloud may be formed, for example, by a network of web servers with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend upon the type of business associated with each user.

Figure 10:
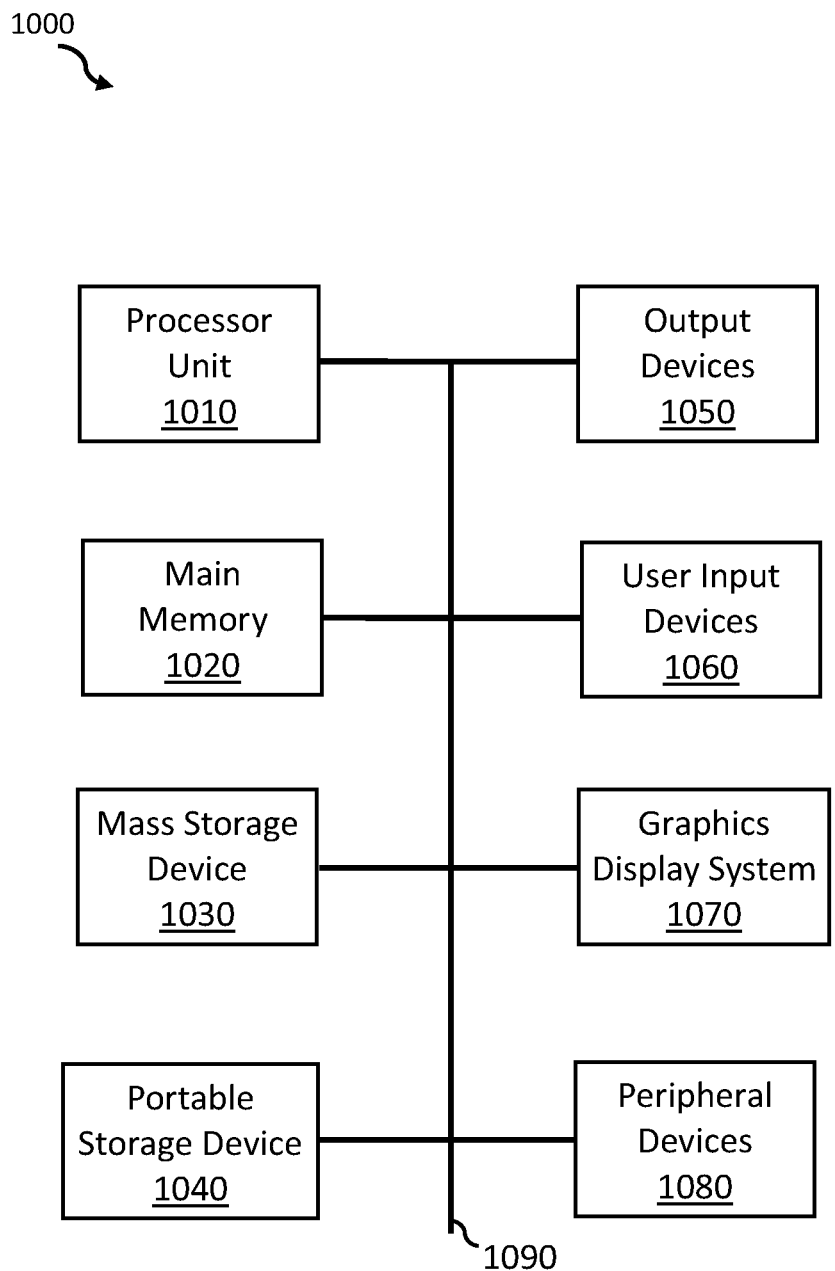
FIG. 10 is block diagram of an exemplary computing system that may be utilized to practice aspects of the present disclosure according to various embodiments.

FIG. 10 illustrates an exemplary computing system 1000 that may be used to implement an embodiment of the present technology. The computing system 1000 of FIG. 10 includes one or more processor units 1010 and main memory 1020. Main memory 1020 stores, in part, instructions and data for execution by processor 1010. Main memory 1020 can store the executable code when the system 1000 is in operation. The system 1000 of FIG. 10 may further include a mass storage device 1030, portable storage device(s) 1040, output devices 1050, user input devices 1060, a graphics display system 1070, and other peripheral devices 1080.

The components shown in FIG. 10 are depicted as being connected via a single bus 1090. The components may be connected through one or more data transport means. Processor unit 1010 and main memory 1020 may be connected via a local microprocessor bus, and the mass storage device 1030, peripheral device(s) 1080, portable storage device(s) 1040, and graphics display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present technology for purposes of loading that software into main memory 1020.

Portable storage device 1040 operates in conjunction with a portable non-volatile storage media, such as a floppy disk, compact disk or digital video disc, to input and output data and code to and from the computer system 1000 of FIG. 10. The system software for implementing embodiments of the present technology may be stored on such a portable media and input to the computer system 1000 via the portable storage device 1040.

User input devices 1060 provide a portion of a user interface. User input devices 1060 may include an alphanumeric keypad, such as a keyboard, for inputting alphanumeric and other information, or a pointing device, such as a mouse, a trackball, stylus, or cursor direction keys. Additionally, the system 1000 as shown in FIG. 10 includes output devices 1050. Suitable output devices include speakers, printers, network interfaces, and monitors.

Graphics display system 1070 may include a liquid crystal display (LCD) or other suitable display device. Graphics display system 1070 receives textual and graphical information, and processes the information for output to the display device.

Peripheral devices 1080 may include any type of computer support device to add additional functionality to the computer system. Peripheral device(s) 1080 may include a modem or a router.

The components contained in the computer system 1000 of FIG. 10 are those typically found in computer systems that may be suitable for use with embodiments of the present technology and are intended to represent a broad category of such computer components that are well known in the art. Thus, the computer system 1000 of FIG. 10 can be a personal computer, hand held computing system, telephone, mobile computing system, workstation, server, minicomputer, mainframe computer, or any other computing system. The computer may also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable media). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While the present invention has been described in connection with a series of preferred embodiments, these descriptions are not intended to limit the scope of the invention to the particular forms set forth herein. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. The present descriptions are intended to cover such alternatives, modifications, and equivalents as may be included within the spirit and scope of the invention as defined by the appended claims and otherwise appreciated by one of ordinary skill in the art. In several respects, embodiments of the present invention may act to close the loopholes in the current industry practices in which good business practices and logic are lacking because it is not feasible to implement with current resources and tools.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

What is claimed is:

1. An apparatus for detection and notification of door status events, comprising:
   a mounting bracket coupled to a peephole in a door; and
   a camera apparatus coupled to the mounting bracket, the camera apparatus comprising:
   a camera positioned such that the camera is capable of capturing images or video through the peephole;
   a sensor capable of sensing a door status event at the door or in proximity to the door;
   a wireless transmitter/receiver capable of communicating with a wireless network and transmitting digital information via the wireless network;
   a central processing unit capable of storing and executing computer code to initiate operation of the camera to capture one or more images or video visible through the peephole when the door status event sensed by the sensor exceeds a predetermined level, and to transmit the one or more images or video using the wireless transmitter/receiver to a predetermined destination on the wireless network; and
   a mechanism to detect when the camera apparatus is decoupled from the mounting bracket,
   wherein the computer code further comprises instructions to send a message to the predetermined destination on the wireless network when the mechanism detects a decoupling of the camera apparatus from the mounting bracket.

2. The apparatus of claim 1, wherein the sensor senses vibrations and the door status event is a knock on the door.

3. The apparatus of claim 1, wherein the sensor senses movement and the door status event is opening or closing of the door.

4. The apparatus of claim 1, wherein the sensor senses vibrations and the door status event is insertion of a key into a door lock.

5. The apparatus of claim 1, wherein the sensor senses vibrations and the door status event is an attempt to operate a door handle.

6. The apparatus of claim 1, wherein the sensor senses sounds and the door status event is a sound made in proximity to the door.

7. The apparatus of claim 1, wherein the sensor senses motion and the door status event is a person moving in proximity to the door.

8. The apparatus of claim 1, wherein the sensor senses heat and the door status event is a presence of a person or a fire in proximity to the door.

9. The apparatus of claim 1, wherein the predetermined destination on the wireless network is a cloud-based server such that the transmitted one or more images or video are available for download at a later time by a user.

10. The apparatus of claim 1, wherein the predetermined destination on the wireless network is a mobile device application.

11. The apparatus of claim 1, wherein the predetermined destination on the wireless network is an email account.

12. The apparatus of claim 1, wherein the computer code further comprises one or more algorithms to determine if the one or more images or video captured by the camera contains useful information and only transmitting the one or more images or video when the one or more images or video contains useful information.

13. The apparatus of claim 12, wherein the camera is configured to record a plurality of images or videos, the one or more algorithms determine a highest quality image or video, and the highest quality image or video is transmitted.

* * * * *